June 11, 1963 P. L. V. FLAMANT ETAL 3,093,524
WOOD CHIPS
Filed Feb. 10, 1960 2 Sheets-Sheet 1
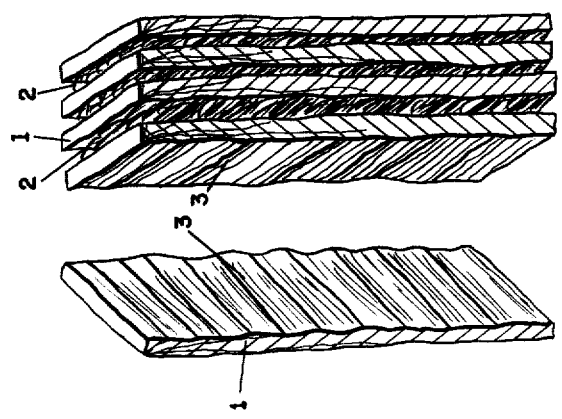
FIG. 3
FIG. 2
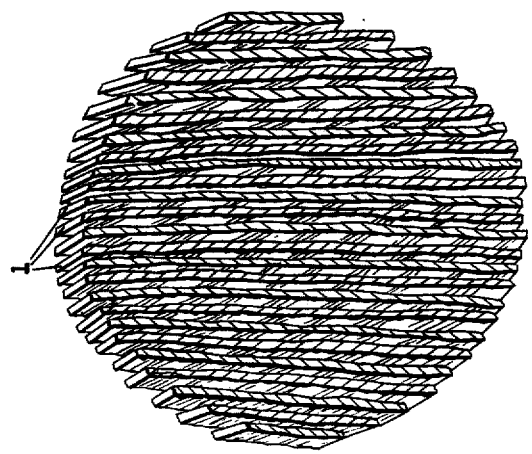
FIG. 1
INVENTORS
Pierre Louis Victor Flamant
Michel Jean-Marie Linares
BY Karl W. Flocks
ATTORNEY

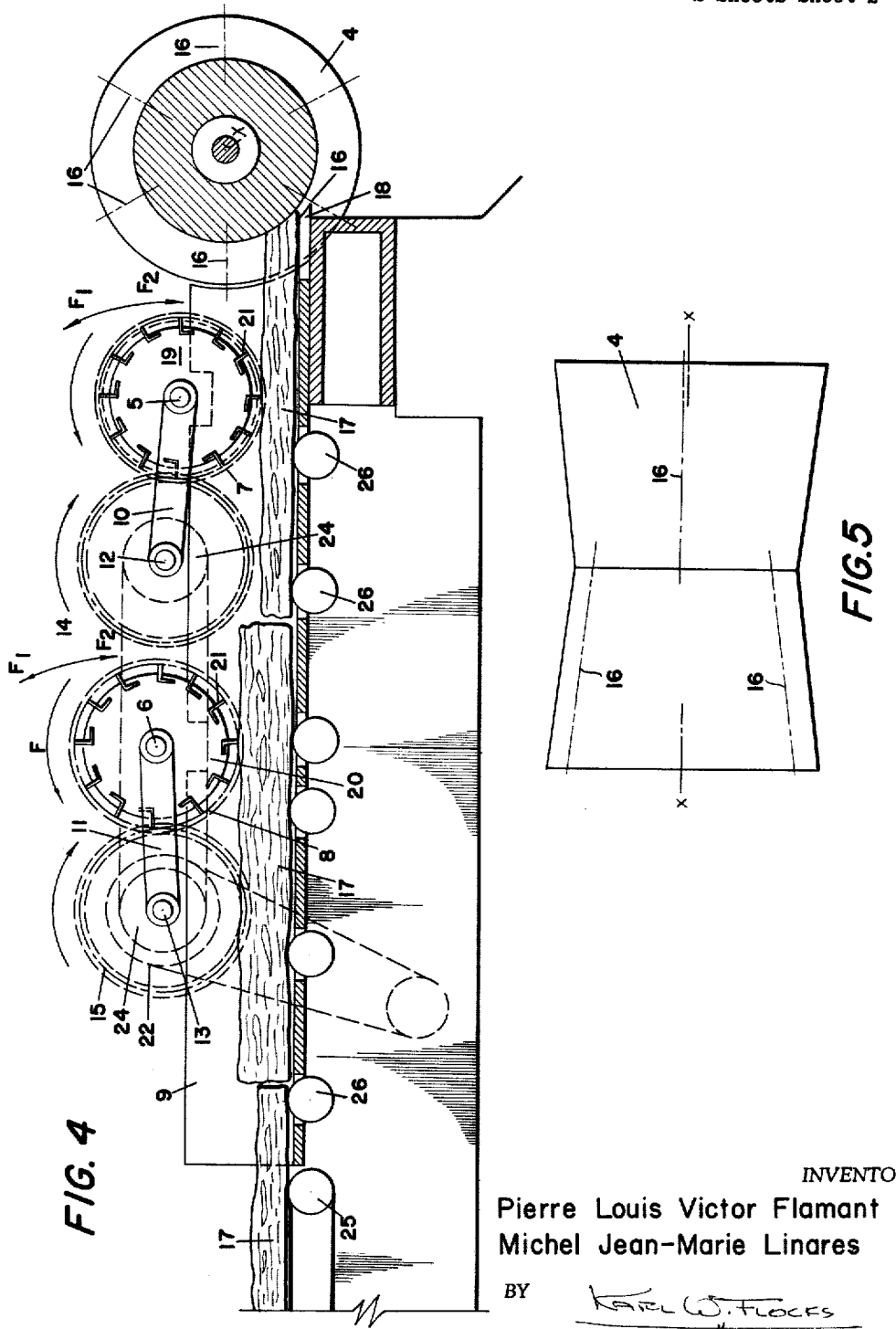

3,093,524
WOOD CHIPS

Pierre Louis Victor Flamant, Chaponval, Auvers-sur-Oise, and Michel Jean-Marie Sinares, Versailles, France, assignors to Etablissements Linares Frerers, Dordogne, France, a joint-stock company of France, and Societe de Developpement des Procedes Isogrand (Isodev), Paris, France, a limited-liability company of France
Filed Feb. 10, 1960, Ser. No. 7,887
Claims priority, application France Feb. 17, 1959
5 Claims. (Cl. 154—43)

The present invention relates to lamellated wood chips capable of being produced in quantity on an industrial scale, and, more particularly, the present invention relates to natural wood chips each shattered into a series of separate loosely interconnected lamellae in which the vast majority of separate individual component fibres have been almost completely separated one from another, suitable for use in such industries as paper-making, to a process for obtaining such chips and to an installation suitable for carrying out this process.

It has previously been known to produce wood chips which are lamellated by cutting in order to expose a large effective surface area to a fluid treatment, no attempt being made to separate the individual component fibres one from another. But any fluid treatment to which these lamellated chips are subjected is lengthy and uneven due to the fact that the treating fluid must work its way from the exposed surface through a multitude of unseparated fibres in order to permeate the entire chip, and therefore surface fibres are subjected to the action of the treating fluid for a much longer period of time than those at the core of the lamella, penetration by the fluid being slow, difficult and irregular.

It has also been previously known to cut and crush wood chips in an attempt to separate at least some of the individual component fibres and allow quicker permeation by a treating fluid. However, this crushing not only damages a large proportion of the component fibres that re-orientates them into an entangled mass, deforming them in an unpredictable manner. In this heterogeneous mass of cut and crushed material particles of different sizes, different exposed effective surface areas and different densities are present, aimlessly distributed in the mass resulting from any one cut. Nor is there any certainty of consistency between one cut and another, even considering consecutive cuts made by the same machine on the same piece of timber.

Moreover, in the various processes current in industry for producing wood chips, suitable, for example, for pulping, no attempt has been made to shatter the wood chip by taking advantage of constraining forces directed on the chip at the time of cutting, nor has advantage been taken of the internal stresses induced in the chip as a result of external applied forces, or of the energy contained in the chip as it is cut, to break the adhesion of the component fibres one to another in the natural timber.

It can therefore be understood that in the current state of the art wood chips produced on an industrial scale for pulping are not conditioned satisfactorily for the treatments to which they are subsequently subjected.

For many years a means of manufacturing semi-chemical and mechanical-chemical pulps has been sought using deciduous wood and employing hot or cold chemical ingredients with or without pressure, and it is in this field particularly that chips suitably conditioned prior to pulping are required.

It has now been discovered that by directing constraining forces on the natural timber as it is being chipped, the chips produced shatter into a series of separate, substantially parallel lamellae, loosely interconnected, each lamella being separated from an immediately adjacent lamella by a plurality of projecting surface lignous fibres at random zones, requiring only a slight pull for complete separation, the said chips being ideally suited for pulping and analogous treatments.

The invention in its broader aspects contemplates feeding a supply of timber in the longitudinal direction of its component fibres to a cutting machine, wherein it is chipped, while applying constraining forces to the timber being chipped to prevent undue displacement of the timber and consequent loss of energy, whereby the chips shatter, on being cut, into interconnected parallel lamellae presenting a creped appearance and a very large exposed or effective surface area in comparison with a similar unshattered chip.

The lamellae obtained in accordance with the invention do not result from the direct effect of cutting, but rather from the effect of shattering due to forces opposing the adherence of the fibres to one another, which forces become greater than the said force of adherence on receiving impact energy from the cutter.

Each lamella is itself partially disaggregated, while remaining coherent, thereby forming a porous mass presenting bundles of lignous fibres distributed over its lateral surfaces, these lignous bundles interpenetrating with the lignous bundles projecting from the lateral surfaces of immediately adjacent lamellae. Each lamella is thus separated from adjacent lamellae by a certain distance, enclosing thereby a volume which is only occupied at random zones by the said lignous bundles interconnecting adjacent lamellae.

As the lamellae are separated from one another their lateral surfaces are exposed to any fluid into which the chip in accordance with the invention is required to be placed. The effective exposed surface area is accordingly made up on the one hand by the exposed core of each lamella constituted by separated fibres which form together a type of capillary tubing, and by the exposed lateral surfaces, which are themselves porous and of creped appearance, of each lamella.

In this new technique the impregnation of the chips plays a very important role and hence the shape of the chips, their regularity and their size have come in for particular study.

In the case of hot or cold impregnation of the chips their shape and size are of very great importance and it is imperative to obtain chips subject to very rapid penetration in order to cut the treatment time during continuous manufacture to a minimum.

It is therefore an object of the present invention to overcome previously inherent drawbacks and provide a natural wood chip which is not only in lamellated form but in which almost all of the individual component fibres in each lamella are almost completely separated from one another while retaining points of adhesion to adjacent fibres along their length at random zones in order to present the maximum exposed effective surface area to a treating fluid while remaining part of a coherent mass.

Another object is to provide wood chips suitable for pulping as in, for example, the paper-making industry.

Another object is to provide wood chips consistently having a much larger exposed effective surface area than has been practicable to obtain consistently in industry heretobefore.

Another object is to provide wood chips which can be very quickly and completely permeated by a treating fluid.

Another object is to provide wood chips having their individual component fibres separated by shattering only, which shattering is the result of cutting the chip from an initial piece of timber in a suitable manner.

Another object is to take advantage of the effect of constraining forces on the piece of timber from which the chip is cut at the time that said chip is cut in order to effect the shattering of said chip.

Another object is to take advantage of the energy contained in the chip at the time it is cut from the piece of timber in order to effect the shattering of said chip.

Another object is to provide wood chips shattered in a substantially consistent and predictable manner.

Another object is to provide shattered wood chips wherein the fibres are substantially undamaged and maintained mostly substantially parallel to one another and to their normal direction in the unshattered natural state.

Another object is to provide a process for producing the chips in accordance with the invention.

Another object is to provide a process whereby shattered wood chips are produced quickly and economically, suitable for direct application in industry.

Another object is to provide an installation for producing the chips in accordance with the invention.

With the foregoing and other objects in mind, the invention resides in the novel product, the process for producing this product, and an installation for carrying out this process, hereinafter described and claimed, it being understood that changes in the precise embodiments herein disclosed may be made within the scope of what is claimed without departing from the spirit of the invention.

Other objects and advantages will become apparent from the following description taken in conjunction with the accompanying drawings in which:

FIGURE 1 shows in perspective a roundel of wood shattered in accordance with the invention.

FIGURE 2 is a perspective view to a larger scale showing diagrammatically one component lamella of the roundel shown in FIGURE 1.

FIGURE 3 shows to a larger scale several lamellae of the roundel in FIGURE 1, these lamellae being interconnected, in conformity with the invention, by a plurality of projecting surface lignous fibres.

FIGURE 4 is a longitudinal section, substantially diagrammatic, of one possible advantageous form of an installation for obtaining the shattered chips of the invention.

FIGURE 5 is an elevation of the rotary member or drum chipper or shattering cutter of the cutting machine of FIGURE 4, looking from right to left at FIGURE 4.

In referring to FIGURES 1, 2 and 3 it can be seen that the chip presents lamellae 1 which are substantially parallel to each other and to the direction of the wood fibres in the natural state. These lamellae 1, as can be seen in FIGURE 3, are interconnected at random zones by bundles of fibres 2. The component fibres 3 of each lamella 1 are themselves separated by shattering into a porous matrix while remaining interconnected, thereby constituting the lamella proper, which accordingly gives the appearance of a coherent porous body of partially disaggregated wood fibres.

Such chips with these advantageous characteristics can be used for many purposes amongst which their application to the manufacture of wood pulp for the paper-making industry is perhaps the most interesting. The present description is therefore being given in connection with the manufacture of wood pulp by way of example, it being understood that the invention is in no way limited to this particular application.

In the wood pulp industry it is known that, in manufacturing the pulp, use is made of wood chips of resinous or deciduous character which are obtained by a variety of machines styled "chippers."

The chips transformed into pulp are generally of as regular size as possible (2 cms. long, 1.5 cms. wide and from 5 to 7 mms. thick). All the known machines are directed to obtaining regular chips, the product before use being passed through classifying devices, and exceptionally large pieces being sent through crushers.

In the present invention classifying devices and crushers are unnecessary, and the sizes of the individual chips are unimportant except in respect of the length of fibre desired which is a function only of the thickness of the chip.

Generally speaking the present invention provides chips which, by their structure and their very large exposed surface area, allow of rapid cold impregnation without the aid of any heat or pressure, or hot impregnation, by any liquid, for example caustic soda.

It is obvious that the impregnating liquid penetrates the chips in accordance with the invention due to the very large exposed surface area of the shattered lamellae, the enveloping faces of which are completely porous and present a creped appearance.

It has accordingly been found that, for example, the impregnation of a normal chip which formerly required two and a half hours (cold and without pressure) can now take place as effectively in a dozen minutes or so with chips in accordance with the invention of comparable volume.

It is of course obvious that the shape of the above described chip, allowing easy impregnation in the case of chemical, semi-chemical, mechanical-chemical, or mechanical pulp manufacture, can be advantageously applied and to greater effect in the manufacture of chemical pulps by present universally applied processes.

The exceptional permeability of these lamellated chips will entail substantial modification to the currently prevailing working conditions.

The example of a chip such as shown in FIGURE 1 contains lamellae parallel to a diameter of the round piece of timber from which it came.

The best results are obtained by sectioning the initial timber into chips of at least 1 mm. and preferably from 5 to 15 mms. thick.

In order to obtain wood chips conforming to the invention it is possible to work with any type of cutting machine whatsoever in an appropriate manner according to the following process. This process comprises feeding a piece of timber along feed means to a cutting machine, directing a constraining force to act on said piece of timber at a point located on the surface of said piece of timber opposite to that surface of said piece of timber in contact with said feed means and in proximity to the extremity of said piece of timber nearest to said cutting machine, and cutting said piece of timber into a plurality of chips in such a manner that, at the moment of cutting, the wood, subjected to said constraining force, in addition to the other forces produced by the machine, absorbs a considerable quantity of energy of impact, which shatters the chip due to this impact energy together with the energy provided by the other forces, e.g. constraining, reaction, friction, vibration etc., being freed or restored at the moment when the chip is cut.

The wood is preferably fed in the longitudinal direction of its component fibres towards the cutting machine.

In order to do this the preferred cutting machine is a rotary cutting machine, i.e. a machine carrying cutter blades mounted on a rotary member. It is also preferable that the wood be firmly maintained against the rotary member in order to avoid any relative displacement of this wood, that the cutting speed be relatively high, and that either the angle formed between the longitudinal axis of the timber (which is fed substantially in the longitudinal direction of its component fibres) and a plane passing through the axis of the rotary member of the cutting machine measured between said longitudinal axis of the timber and the direction in said plane parallel to the axis of said rotary member from its point of interpenetration with said plane, or the angle of attack of the cutter blades of the cutting machine with respect to the longitudinal direction of the component fibres of the timber, be comprised between zero and 90°.

The chipper used for carrying out this process can be of any type whatsoever. The following description will be given by way of example for an installation for carrying out the process for producing chips according to the invention, using a type of chipper hereinafter referred to as a "diabolo" i.e. a chipper whose rotary member comprises two coaxial truncated cones joined together by their small bases and whose cutter blades are mounted along generatrices of these truncated cones in accordance with the desired angle.

Referring now to FIGURES 4 and 5, the rotary member or drum of the chipper is represented by the reference 4. The feed to the chipper is effected along a preferably horizontal channel 9, this channel being therefore perpendicular to the vertical plane passing through the axis X of the drum 4 of the machine. The longitudinal axis of the feed channel can be located slightly below axis X. The channel comprises (in accordance with its length) one or more rollers such as 26, penetrating the bottom of the channel, to transport the wood 17 towards the anvil 18 where it is cut by the cutter blades (of axes 16) projecting radially from the periphery of the cutter blade carrier or drum 4. Preferably the distance between the edge of the anvil 18 and cutter blades (16) is only sufficient to allow for a working clearance, i.e. it is a minimum.

Acting in conjunction with the rollers 26 are one or more rollers such as 19 and 20 mounted above the channel and bearing spikes 21 or any other device capable of gripping and pulling the wood 17.

These rollers constitute at the same time both the feeding means and the constraining means for the wood. It is desirable that the roller 19 be situated as close to the drum 4 as is practical.

Each of the rollers 19 and 20 can consist of several wheels, biased co-axially, but capable of independent vertical displacement, in order to allow (in accordance with the width of channel 9) several logs of timber of different diameters to be accommodated at the same time.

Each of these wheels is mounted on separate shaft elements, biased co-axially, forming a set of shafts 5 in roller 19 and a set of shafts 6 in roller 20.

In the installation illustrated in the drawings both rollers 19 and 20 have been represented as consisting of one wheel element each, in order to simplify the description.

Each of the shafts 5 and 6 bears on one or both extremities gear-wheels such as 7, 8 locked on the shafts 5, 6. Each of these assemblies turns between pairs of arms such as 10, 11, this rotation taking place in the direction of arrows F. The arms 10, 11 are freely mounted, on the one hand on shafts 5, 6, and on the other hand on shafts 12, 13.

The arms 10, 11 are therefore mounted so that they can pivot about the shafts 12, 13 and raise or lower the assemblies mounted on shafts 5, 6 in an arcuate path indicated by arrows $F_1$, $F_2$ as a function of the diameters of the timber in contact with the rollers 19, 20, together with the displacement of the upper contour of said timber with respect to the channel as the said timber passes rollers 19, 20, so that said rollers always ride the upper contour of the timber with which they are in contact.

The shafts 12 and 13 are mounted in bearings (not shown) located on the upper part of channel 9. At the end of these shafts gearwheels such as 14, 15 each engage with corresponding gearwheels 7, 8. The last gear assembly such as 15 of the whole device engages with a chain drive 22 driven by a reducing motor (not shown) bearing a drive pinion 23 (this reducing motor can be replaced by a motor of any kind comprising a control device allowing the speed of the assembly to be varied in accordance with the species of wood to be cut, its dryness or the controllable projection of the cutter blades (16) from the cutter blade carrier 4 which thereby draws the wood more or less quickly).

The driven assembly can itself, by means of chain drives such as 24, drive one or more other assemblies.

With the rollers 19, 20 mounted in this manner, they can, while rotating, ride up or down according to the different thicknesses and sizes of the pieces of timber fed to the machine.

The roller 19 is mounted on its shaft 5 through a conventional free-wheel mounting so that said roller, driven through gear 7, feeds the wood towards the cutting machine and, should the wood be drawn faster by the cutting machine, roller 19 would then be rotated faster than it is being driven through gear 7 thereby freewheeling on its shaft 5.

The rollers 26 can be smooth or fluted, and can be driven, which thereby allows a more regular advance of the various pieces of timber to take place. These rollers can be driven by conveyor belt 25.

In accordance with a further embodiment, channel 9 can be adjusted laterally to present the timber to the cutting machine so that the longitudinal axis of the said timber makes any desired angle with the cutting edge of the cutters mounted on said cutting machine in order to produce the desired effect. In the above described diabolo machine it is preferable that the longitudinal axis of the channel be in the plane of the small bases of the truncated cones and the desired cutting angle be achieved by suitably selecting the slope angle of the truncated cones and hence the angle of attack of the cutters mounted thereon, the cutters themselves being mounted at the desired angle tangentially to the periphery of the cone.

In accordance with yet another embodiment, the arms 10, 11 can be replaced by springs, or rollers 19, 20 can be directly mounted in a vertical spring or hydraulic or pneumatic suspension system adapted to provide for the desired vertical displacement of the said rollers.

By working in accordance with the process of the invention, the pieces of wood always being subjected to external constraining forces in a machine of the type described above, the wood shatters into lamellae as it is cut, thereby giving a product such as that shown by way of example in FIGURE 1.

It is to be noted that any knots which are found in the wood to be chipped are also shattered into lamellae with the rest of the chip on being cut.

It is to be observed that the present invention provides an entirely new form of natural wood chip whose properties are substantially predictable and constant, capable of being formed from any species of natural timber whether deciduous or coniferous, thereby avoiding the necessity of grading and sorting timber for processing when clearing virgin forest.

Not only does the invention facilitate forest clearing by being applicable to all species of timber, but the chips produced from each species of timber are immediately suitable for fluid treatment without further processing, such as for example sorting into sizes and crushing the larger chips. This is by virtue of the fact that they are shattered on being cut into a series of loosely interconnected lamellae whose individual component fibres are almost completely separated from one another thereby endowing the chip with the property of exceptionally high and rapid permeability to a treating fluid.

Although the invention has been described in conjunction with preferred embodiments, particularly with respect to the installation for producing the chip of the invention, it is to be understood that modifications and variations may be resorted to without departing from the spirit and scope of the invention, as those skilled in the art will readily understand. Such modifications and variations are considered to be within the purview and scope of the invention and appended claims.

We claim:

1. A natural wood chip for use in pulp manufacture or the like comprising a coherent, porous, fragile body of a substantially uniform thickness ranging upwardly from 5 mm. comprising a series of loosely-interconnected integral natural core lamellae lying in substantially parallel planes and extending in the direction of the natural grain of the chip and substantially in the direction of the thickness dimension of the chip, and a plurality of randomly disposed lignous fibers, integral with and extending laterally from adjacent surfaces of immediately adjacent lamellae, said chip comprising exposed opposite substantially parallel surfaces at which said lamellae terminate, said spaced parallel lamellae forming a plurality of enlarged, fluid-permeable, through-passages communicating with said exposed opposite surfaces, said plurality of randomly disposed lignous fibers extending into and traversing said through-passages, whereby, when said chip is immersed in a treating fluid, the fluid will readily pass through and into said through-passages for maximum surface contact with the adjacent surfaces of said lamellae and permeate quickly through said lamellae by capillary action to provide thorough impregnation of the fluid in said chip.

2. The structure set forth in claim 1, said lignous fibers being loosely connected to adjacent chip lamellae to permit the same to be readily separable one from the other due to relative movement between said adjacent lamellae.

3. The structure set forth in claim 1, said lignous fibers being relatively thin as compared with the thickness of said lamellae and being disposed in substantially spaced and randomly oriented relation with respect to each other.

4. The structure of claim 1, said lignous fibers initially being formed from adjacent surface portions of the respective adjacent lamellae between which they extend.

5. The structure of claim 1, said opposite surfaces of said chip at which said lamellae terminate having a shattered appearance and comprising a plurality of relatively small, porous, spaced surface portions disposed in angular relation to the parallel planes between adjacent lamellae.

References Cited in the file of this patent

UNITED STATES PATENTS

| | | |
|---|---|---|
| 507,499 | Hutchinson | Oct. 24, 1893 |
| 622,194 | Schmidt | Mar. 28, 1899 |
| 670,223 | Criswell | Mar. 19, 1901 |
| 817,382 | Merrill | Apr. 10, 1906 |
| 1,449,862 | Krohn | Mar. 27, 1923 |
| 2,018,712 | Elmendorf | Oct. 29, 1935 |
| 2,570,926 | Elmendorf | Oct. 9, 1951 |
| 2,652,077 | Alexander | Sept. 15, 1953 |
| 2,712,842 | Fahrni | July 12, 1955 |
| 2,727,542 | Fischer | Dec. 20, 1955 |
| 2,776,685 | Clark | Jan. 8, 1957 |
| 2,786,005 | Clark | Mar. 19, 1957 |
| 2,811,183 | Mottet | Oct. 29, 1957 |
| 2,825,373 | Forman | Mar. 4, 1958 |
| 2,827,934 | Latimer | Mar. 25, 1958 |
| 2,876,811 | Matthews | Mar. 10, 1959 |
| 2,923,332 | Osmun | Feb. 2, 1960 |

UNITED STATES PATENT OFFICE
CERTIFICATE OF CORRECTION

Patent No. 3,093,524                                June 11, 1963

Pierre Louis Victor Flamant et al.

It is hereby certified that error appears in the above numbered patent requiring correction and that the said Letters Patent should read as corrected below.

In the grant, line 2, and in the heading to the printed specification, line 4, name of second inventor, for "Michel Jean-Marie Sinares", each occurrence, read -- Michel Jean-Marie Linares --; in the grant, lines 3 and 15, and in the heading to the printed specification, line 5, for "Etablissements Linares Frerers", each occurrence, read -- Etablissements Linares Freres --.

Signed and sealed this 17th day of December 1963.

(SEAL)
Attest:
ERNEST W. SWIDER

Attesting Officer

EDWIN L. REYNOLDS

Acting     Commissioner of Patents